J. P. Lebzelter,
Bending Wood.
No. 2,173. Reissued Feb. 13, 1866.
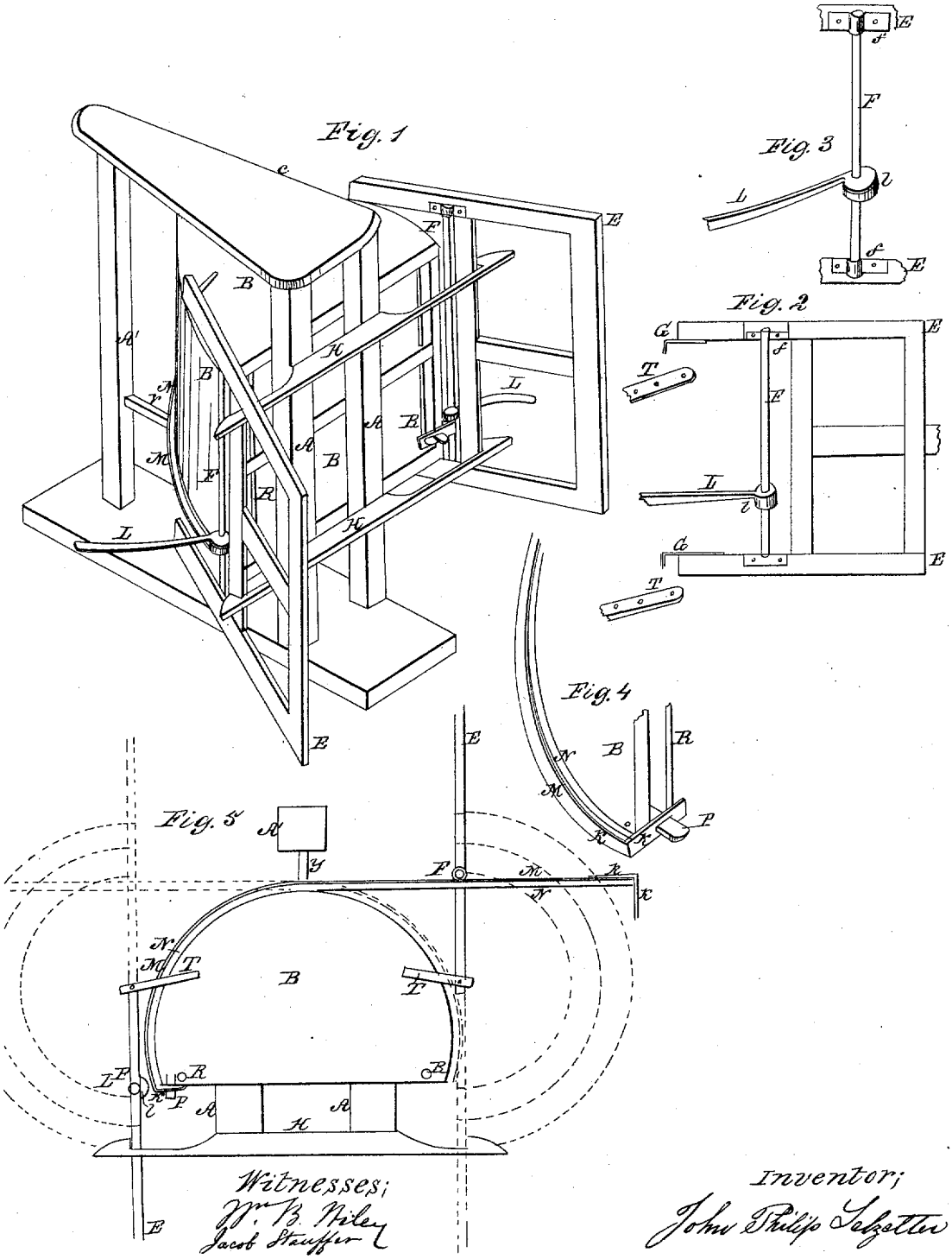
Witnesses;
Wm. B. Riley
Jacob Stauffer
Inventor;
John Philip Lebzelter
A.M. PHOTO-LITHO. CO. N.Y. (OSBORNE'S PROCESS)

UNITED STATES PATENT OFFICE.

JOHN PHILIP LEBZELTER, OF LANCASTER, PENNSYLVANIA.

IMPROVEMENT IN WOOD-BENDING MACHINES.

Specification forming part of Letters Patent No. 46,479, dated February 21, 1865; Reissue No. 2,173, dated February 13, 1866.

*To all whom it may concern:*

Be it known that I, JOHN PHILIP LEBZELTER, of Lancaster, in the county of Lancaster and State of Pennsylvania, have invented new and useful Improvements in Wood-Bending Machines; and I do hereby declare that the following is a full, clear, and exact description of the construction and operation of the same, reference being had to the accompanying drawings, making a part of this specification, in which—

Figure 1 is a perspective view of the machine with my improvements in place, excepting the post A′, shown in the rear of the drum, being shown farther removed from the drum than it should be; Fig. 2, one of the winged or framed side levers, E, showing the upright shaft F for the shifting pulley or eccentric lever L. Fig. 3 shows this shaft F and eccentric lever L separate. Fig. 4 shows one end of the felly N covered with an iron band or strap, M, with its terminal hook K bent at right angles, with a slot for a wedge, P, also a portion of the drum B and vertical rod R. Fig. 5 is a horizontal section illustrating the position of the winged levers E with the vertical rod F brought forward on one side, with the felly bent and wedged, the other wing thrown back, and a portion of the felly straight. Scale, one inch to the foot. The dotted lines show the change of position.

There is no special novelty in the form of the drum, being of a semicircular form, affixed or stationary between the uprights A A in front and the rear upright, A′, a short distance from the drum, and used for the purpose hereinafter stated. There is also a vertical wedge-rod, R, on each side of the drum, near the outer or open diameter, showing also a partition, X. The winged or framed levers E have a plate with a pivot G, (or a continuous rod through the top and bottom of the drum, passing through the plates G, and held with a screw-bur beneath, may form a fulcrum for the levers E.) I, however, use plates T, bolted on the top and bottom of the drum on each side—say at a point one-third of the distance back from the front or open diameter—with a hole or holes for the pivot-pin G on the lever E, Fig. 2. These winged or framed levers E may also be attached by means of hinges when it is not designed to use the same pair of levers and its shaft F on separate drums, in order to fill the same with bended fellies, as by means of the pivot-attachment the levers are readily put on or taken off. The vertical shaft F affixed to the levers E at a point directly opposite the terminus of the felly, with its strap and slotted hook, when the winged levers have performed their office, on which shaft my eccentric shifting lever L operates for producing extra pressure or leverage in order to aid in affixing the wedge P into the slotted hook K, for keeping the felly and appliances firmly in place. I also employ a notched spring or springs H, secured to the upright posts A A, in front or otherwise, for holding the winged levers E while the eccentric lever L is employed.

The operation of my machine may be thus briefly stated: The wings being thrown back, the steamed wood or felly covered with a strap of iron, provided with the right-angled hook attachment, is now laid on the ledge formed by the projection of the bottom of the drum center to center. A wedge, V, is now driven against the center of the felly and the upright post A′ in the rear of the drum, which keeps it in place, the ends of the covered felly projecting in front of the winged levers E. The winged levers are now swung forward, carrying the felly with them, and bending them round the drum simultaneously on both sides, a man or boy operating each lever until they come in contact with the notched spring-holder or holders H in front, which retains them in that position. The eccentric shifting lever L is now used to produce an extra pressure, in order to secure the slotted angle of the hook K, passing the open front beyond the upright rod R, when a wedge, P, is driven between said R and the upright edge of the drum B, which effectually holds them through the slotted angle attached to the strap over the felly, as shown in Fig. 4. Thus secured, a second felly or steamed piece of wood is laid on the first, provided with its hooked iron strap, and kept in place by a wedge driven or pressed down between the rear upright post, A′, and the outside or strap on the felly, and bent around the drum in like manner as the first, and so on, successively releasing the winged levers, bending the wood, shifting the eccentric lever upward, as felly after felly is bent, till the drum is filled from the bottom to the top.

In order to take the strain from the outer surface of the wood in bending, I compress the inner surface by means of a wedge of soft wood between the inner corner of the felly and the angle of the hook K on each side or end, thereby preventing the cracking to which the wood is otherwise subject. Having an extensive factory, in which I employed various machines embraced in several patents, necessity has compelled me to lay them asideand have resource to my own invention for speed and greater efficiency.

I am aware that semicircular drums have been used in various ways—revolving and affording leverage, as well as in combination with chains, screws; also, with a single lever centrally attached to the drum, all of which I disclaim, as well as simple hooks in combination with the covering-strap. But I am not aware that winged or side levers on each side, and removed from the center of the drum, were ever employed prior to my invention thereof, with or without a vertical shaft for the fulcrum of an eccentric lever or its equivalent, nor of the use of right-angled slotted hooks, in combination with a wedge and vertical rod, as shown and specified, as well as the rear upright, A′, behind the drum to aid in retaining the fellies and prevent their slipping, bulging out or upward, while operating the side levers in the manner specified.

The prop or wedge V is no part of the machine, but used temporarily between the felly and post A′ until the two ends of the felly are secured by the keys P in front, when the same prop or wedge V may be used for the next, and so on successively, till all the fellies are bent.

What I claim as my invention, and desire to secure by Letters Patent, is—

1. The winged or framed side levers, E, held by a pivot or hinge affixed by a bolt or plate on each side of the drum, substantially in the manner shown and specified.

2. The binding-straps M, when they are firmly united to a slotted hook affixed to each end of the same, in the manner and for the purpose specified.

J. PHILIP LEBZELTER.

Witnesses:
WM. B. WILEY,
JACOB STAUFFER.